(12) United States Patent
Little

(10) Patent No.: US 10,868,618 B2
(45) Date of Patent: Dec. 15, 2020

(54) DEVICE AND METHOD FOR PROVIDING A SYNCHRONIZED PATTERN SEQUENCE ON MULTIPLE DEVICES

(71) Applicant: Kristin Renee Little, San Jose, CA (US)

(72) Inventor: Kristin Renee Little, San Jose, CA (US)

( * ) Notice: Subject to any disclaimer, the term of this patent is extended or adjusted under 35 U.S.C. 154(b) by 0 days.

(21) Appl. No.: 16/568,114

(22) Filed: Sep. 11, 2019

(65) Prior Publication Data

US 2020/0092013 A1 Mar. 19, 2020

Related U.S. Application Data

(60) Provisional application No. 62/730,537, filed on Sep. 13, 2018.

(51) Int. Cl.
| | |
|---|---|
| *H04B 10/69* | (2013.01) |
| *H04W 4/80* | (2018.01) |
| *H04B 10/63* | (2013.01) |
| *H04B 10/67* | (2013.01) |
| *H04N 7/18* | (2006.01) |
| *H04W 4/02* | (2018.01) |
| *H04M 1/72* | (2006.01) |

(52) U.S. Cl.
CPC .......... *H04B 10/695* (2013.01); *H04B 10/63* (2013.01); *H04B 10/67* (2013.01); *H04W 4/80* (2018.02); *H04M 1/72* (2013.01); *H04N 7/18* (2013.01); *H04W 4/02* (2013.01)

(58) Field of Classification Search
CPC ...... H04B 10/695; H04B 10/63; H04B 10/67; H04W 4/80; H04W 4/02; H04M 1/72; H04N 7/18
USPC ......................................................... 398/202
See application file for complete search history.

(56) References Cited

U.S. PATENT DOCUMENTS

| | | | | |
|---|---|---|---|---|
| RE45,061 E | * | 8/2014 | Karr ...................... | G01S 13/765 |
| | | | | 342/44 |
| 9,697,714 B2 | * | 7/2017 | Karr ...................... | G08B 21/24 |
| 10,231,271 B2 | * | 3/2019 | Kim ........................ | H04W 76/14 |
| 10,397,751 B2 | * | 8/2019 | Shapiro .................. | G16H 40/63 |
| 10,588,208 B1 | * | 3/2020 | Loomis .................. | H05B 47/19 |
| 2003/0017823 A1 | * | 1/2003 | Mager ..................... | H04M 1/22 |
| | | | | 455/414.1 |
| 2004/0263494 A1 | * | 12/2004 | Poor ........................ | A63F 13/10 |
| | | | | 345/204 |
| 2014/0038636 A1 | * | 2/2014 | Karr ........................ | G01S 5/0284 |
| | | | | 455/456.1 |

(Continued)

*Primary Examiner* — Abbas H Alagheband
(74) *Attorney, Agent, or Firm* — Weide & Miller, Ltd.

(57) ABSTRACT

A synchronized pattern sequence system including a processor and a timing receiver configured to receive a time reference signal to set a time of the electronic device. The system further includes sequence receiver configured to receive a sequence pattern and a timing for presenting the sequence pattern and a pattern indicator configured to present the sequence pattern. The system also has a memory and machine-readable code stored in the memory. The machine-readable code is configured to cause the processor to direct the pattern indicator to present the sequence pattern as a recognizable pattern according to the received timing in synchronization with the sequence pattern presented on at least one other electronic device.

18 Claims, 7 Drawing Sheets

(56) References Cited

U.S. PATENT DOCUMENTS

| | | | | |
|---|---|---|---|---|
| 2014/0203950 A1* | 7/2014 | Zdeblick | ............ | A61B 5/6803 |
| | | | | 340/870.07 |
| 2015/0201308 A1* | 7/2015 | Karr | ............ | G08B 21/0227 |
| | | | | 455/456.2 |
| 2016/0321902 A1* | 11/2016 | Karr | ............ | G01S 5/0284 |
| 2017/0310743 A1* | 10/2017 | Aoyama | ............ | G06F 16/958 |
| 2017/0354795 A1* | 12/2017 | Blahnik | ............ | G06F 3/011 |
| 2018/0270884 A1* | 9/2018 | Fraser | ............ | H04W 28/26 |
| 2019/0208363 A1* | 7/2019 | Shapiro | ............ | G16H 50/30 |
| 2020/0059269 A1* | 2/2020 | Carter | ............ | G06F 1/163 |

\* cited by examiner

DEVICE AND METHOD FOR PROVIDING A SYNCHRONIZED PATTERN SEQUENCE ON MULTIPLE DEVICES

1. PRIORITY CLAIM

This application claims priority to and the benefit of U.S. Provisional Patent Application No. 62/730,537 filed on Sep. 13, 2018, the contents of which are incorporated by reference in its entirety herein.

2. FIELD OF THE INVENTION

The present invention relates to an electronic device and method for synchronizing a pattern sequence presented on a plurality of electronic devices.

3. BACKGROUND OF THE INVENTION

From time to time, people have a sentimental link, and those people may be a far distance apart. While people used telecommunication devices to achieve such a link (phone calls for example, or email), it would be desirable to have a device that may stay in the background or be clipped to someone's dress or jacket, where the device blinks or otherwise presents a pattern sequence in synchrony with a similar device another person possesses or is wearing. This allows the people, or group of people to become linked and connected by the devices which present the same pattern.

SUMMARY

Aspects of embodiments of the invention include an electronic device, a corresponding method and system that includes a processor, a timing receiver configured to receive a time reference signal to set a time of the electronic device, a sequence receiver configured to receive a sequence pattern and a timing for presenting the sequence pattern, a pattern indicator configured to present the sequence pattern, a memory and machine-readable code stored in the memory, the machine-readable code configured to cause the processor to direct the pattern indicator to present the sequence pattern as a visually recognizable pattern, according to the received timing in synchronization with the sequence pattern presented on at least one other electronic device.

In other embodiments, the electronic device includes a processor, a timing receiver configured to receive a time reference signal to set a time of the electronic device, a sequence receiver configured to receive a sequence pattern and a timing for presenting the sequence pattern, a pattern indicator configured to present the sequence pattern, and a memory configured with non-transitory machine-readable code stored, the machine-readable code configured to cause the processor to direct the pattern indicator to present the sequence pattern as a visual, audio or vibratory sequence that is perceivable by humans according to the received timing in synchronization with the sequence pattern presented on at least one other electronic device.

In embodiments of the invention, the timing receiver may be a GPS receiver or a radio receiver. In embodiments of the invention, the sequence receiver may be a light sensor, a microphone, a Bluetooth receiver and/or a WiFi receiver, and/or a user interface. The user interface may be configured to allow a user to select from a plurality of predetermined sequence patterns and/or a plurality of timings.

In embodiments of the invention, a system may include a plurality of the electronic devices and a server configured to present the sequence pattern and a timing for presenting the sequence pattern to the electronic devices.

Additional embodiments include methods of presenting an audio, visual or vibratory sequence pattern at a plurality of electronic devices, including receiving a same time reference signal at a timing receiver of each of the plurality of the electronic devices, setting a time for each of the electronic devices according to the received time reference signal, receiving a sequence pattern and a timing for presenting the sequence pattern at a sequence receiver of each of the electronic devices, and presenting the sequence pattern as a synchronous audio, visual or vibratory indicator on each of the electronic devices according to the received sequence pattern and the received timing.

The electronic devices may be in close proximity or may be miles apart, or even on different continents. The electronic device uses accurate time sources, such as a Global Positioning System (GPS) to achieve synchronicity between devices.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

In the following description, numerous specific details are set forth in order to provide a more thorough description of embodiments of the present invention. It will be apparent, however, to one skilled in the art, that the embodiments of the present invention may be practiced without these specific details. In other instances, well-known features have not been described in detail so as not to obscure the embodiments of the present invention.

Disclosed is a device and method used to synchronize in time a plurality of devices so that the devices present a pattern or a sequence of patterns in a synchronous fashion with each other. For example, two or more of the devices can blink or otherwise present a pattern at a same time and present the same sequence even if the devices are on opposite sides of the globe. The sequence pattern is presented as a visual, audio or vibratory sequence that is perceivable by humans. The device can be a relatively small device, such that the device can be easily worn by or carried by individuals.

By presenting the pattern or sequence of patterns in synchronization, it is meant that the patterns are presented at substantially a same time, such that the patterns are perceived as being presented simultaneously. However, the patterns may be considered to be presented simultaneously or in synchronization even if they are slightly offset in time, such as up to 30 milliseconds. If the device detects or estimates that the synchronization is off by more than this amount it can either re-synchronize with the time source (GPS for example) or prompt the user to re-synchronize the device.

A plurality of the devices can be used in many situations. For example, the devices can be used to present the same sequence pattern to family members separated by great distances so family members can think of their loved ones while separated. Additionally, the devices could be used in a situation where many people of a group each have a device, so that the devices in one location can be set to simultaneously present the sequence patterns. The group of people may be concert attendees, convention or meeting attendees, classmates, teammates, co-workers, fans, or any other group with some aspect of commonality.

Figure 1:
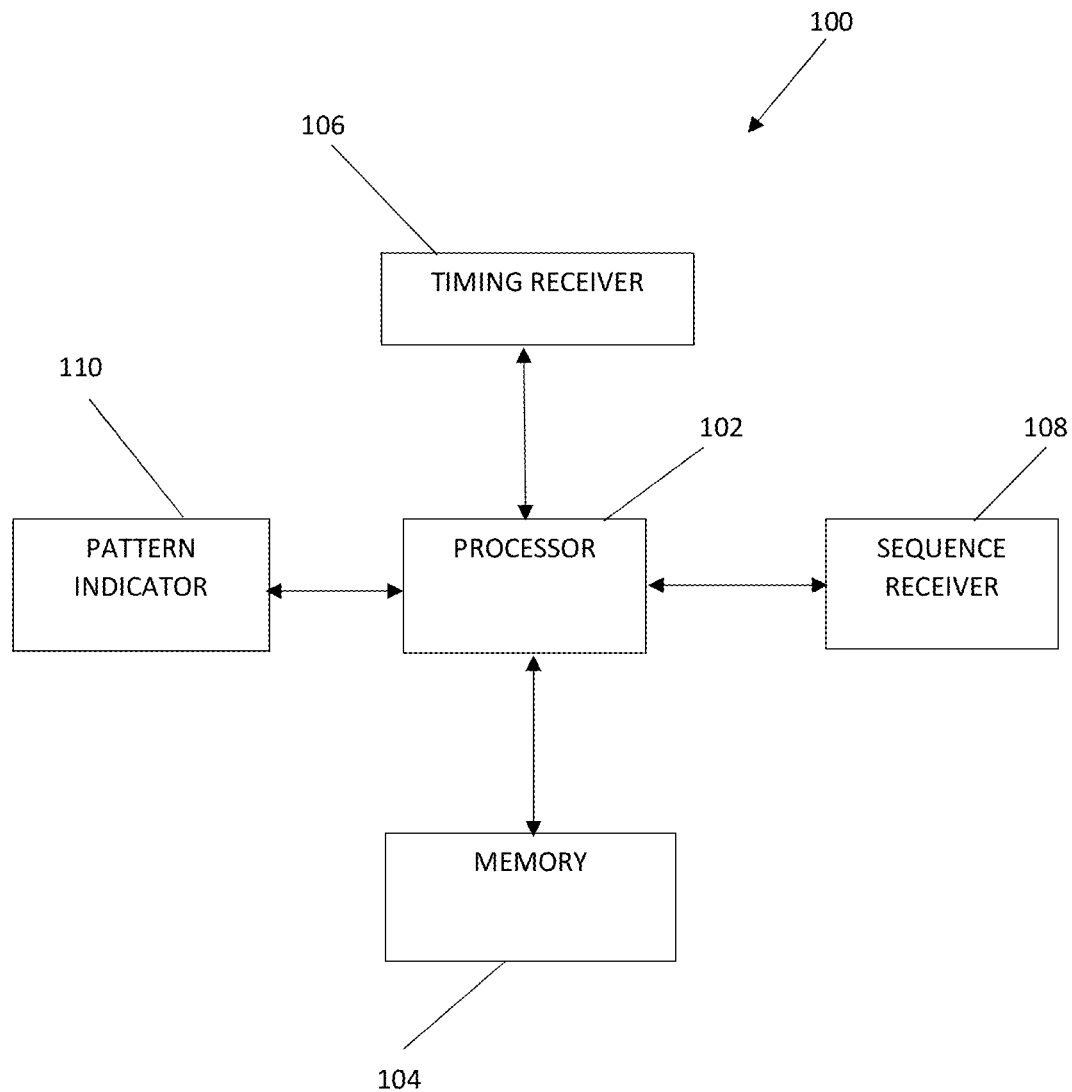
FIG. 1 illustrates a block diagram of an electronic device according to embodiments of the invention.

Embodiments of the invention will now be described in more detail, commencing with reference to FIG. 1. As illustrated in FIG. 1, one embodiment of a device 100 of the invention includes a processor 102, a memory 104, a timing receiver 106, a sequence receiver 108, and a pattern indicator 110.

The processor 102 may be configured to execute various instructions including machine readable code and machine executable instructions (comprising executable software or embedded as hardware). The memory 104 may be any type of a data storage device, such as one or more forms of semi-conductor type storage device, including but not limited to ROM or RAM (such as EEPROM, PROM, etc., as are now known or later developed), and other types of memory devices or the like. The memory 104 may store the non-transitory instructions (machine readable code and machine executable instructions) to be executed by the processor 102. The memory may also store one or more sequence patterns which may be selected at the time of manufacture, or by the user. In one embodiment, the device 100 includes a user interface through which the pattern may be set or selected. The user interface may be a touch interface, one or more buttons, a USB or similar wired/wireless interface to facilitate programmability.

The timing receiver 106 is configured to receive a timing signal to accurately set a clock of the device. The timing receiver 106 may receive the timing signal from any source of such timing signals. For example, the timing receiver may be a GPS (global positioning system) receiver or other type of receiver configured to receive a GPS signal, which includes a very accurate time signal. The processor 102 is configured to use/get the timing signal to set the clock or other synchronization signal of the device 100.

The sequence receiver 108 is configured to receive a pattern sequence, which may be stored in the memory 104. The sequence receiver 108 may also receive a time or times at which the pattern sequence is to be presented on the device, which may be stored in the memory 104, in association with the pattern sequence. In alternate embodiments, the timing and/or the pattern sequence may be set by a user of the device 100, in which case the sequence receiver 108 could be a user interface where a user could enter or select the pattern of the sequence and the time at which the sequence is presented, which may be stored in the memory 104 for later execution by the processor 102.

The sequence receiver 108 may be a light sensor, a microphone, wireless signal receiver, user input device, or other device that can detect a pattern sequence, which is then stored in the memory. When the sequence receiver 108 is a light sensor, the light sensor is configured to detect a sequence of light signals presented to it, which can be stored and presented on the device according to a selected timing. The sequence of light signals may be from any source, such as the user, website, a cell phone or tablet application, a video, a television, or presented at a concert, meeting or other event.

Likewise, when the sequence receiver 108 is a microphone, the microphone is configured to detect a sequence of sound signals presented to it, which can be stored and presented on the device according to a selected timing. The sequence of sound signals may be from any sources, such as the user, a cell phone or tablet application, a website, radio, video, a television, or presented at a concert, meeting or other event.

Sequence receiver 108 can also receive an encoded sequence used to configure the device in order to set a new pattern to be presented, set new pattern timing, or alter other parameters in the device.

The pattern indicator 110 is configured to present the pattern sequence according to the stored sequence and the stored timing as directed by the processor 102. The pattern indicator 110 may be any kind of device that can present a pattern sequence as a visual sequence, a sound sequence, vibration, or other sequence that may be perceived by humans.

For example, the pattern indicator 110 may be an LED (light-emitting diode), a speaker, an actuator or other device. When the pattern indicator 110 is an LED, the LED will be triggered according to the pattern sequence and timing. When the pattern indicator 110 is a speaker, the speaker will be triggered to present a sound or sounds according to the pattern sequence and timing. Any type of pattern indicator may be set to present a pattern perceivable by humans. The pattern indicator 110 may be a screen (visual device), vibrator or thumper, speaker (audio device), or one or more LEDs.

Figure 2:
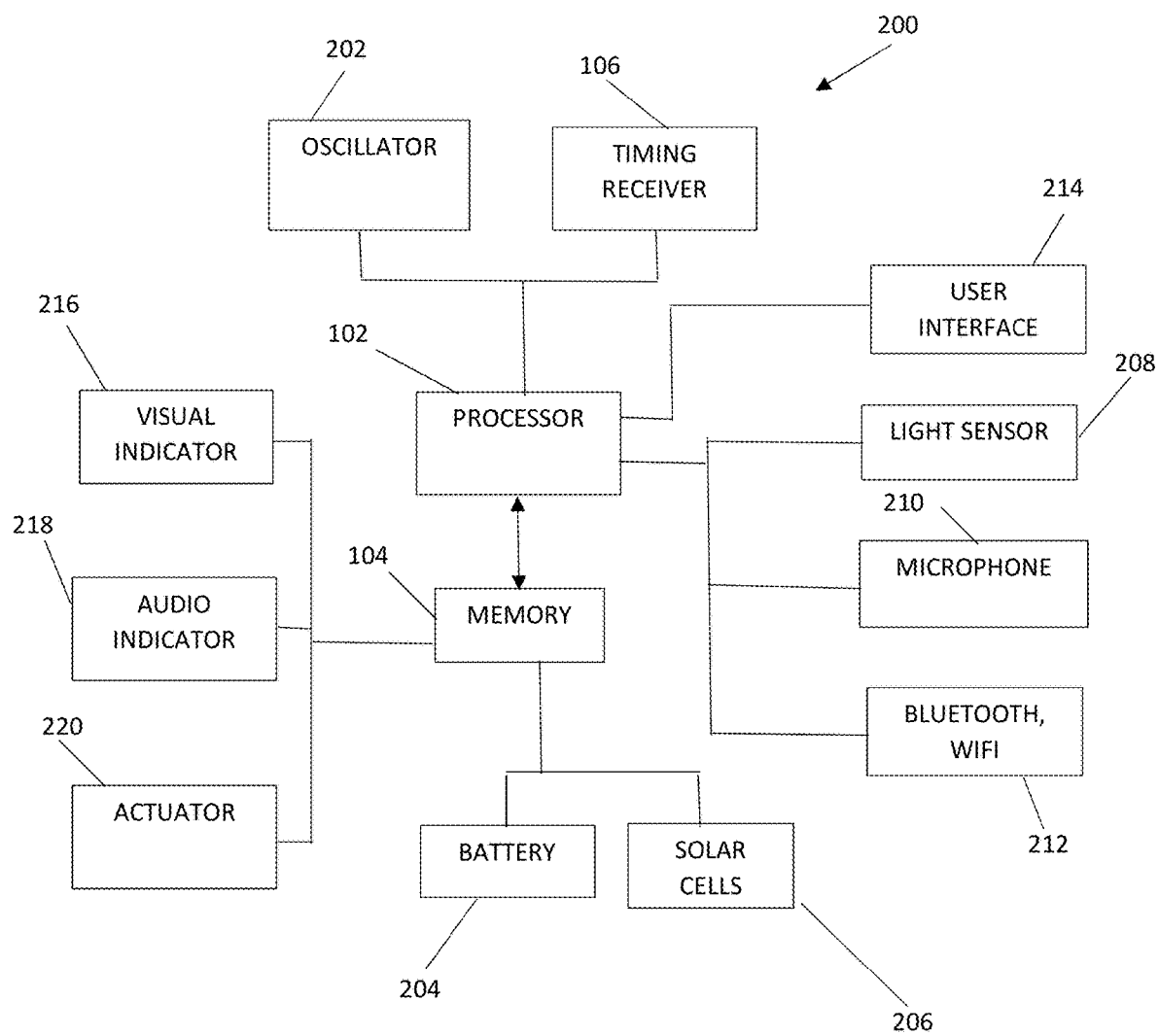
FIG. 2 illustrates a block diagram of an electronic device according to embodiments of the invention.

Another embodiment of the invention is illustrated in FIG. 2. The device 200 shares the processor 102, the memory 104 and the timing receiver 106 with the embodiment of FIG. 1 and thus those elements are not further described. The device 200 may also include an oscillator 202. The oscillator 202 may be used in conjunction with processor 102 to measure time passage after the clock is set. The device 200 may also include a battery 204 and/or one or more solar cells 206 to provide power to the device 200. Any other power source could also be used.

The device 200 may also include light sensor 208 and/or microphone 210 as a sequence receiver. A Bluetooth or WiFi receiver 212 (with associated antenna) may be included and may be configured to receive the pattern sequence and/or the timing signal.

The device 200 may also include a user interface 214. The user interface 214 may be configured to present various options to the user. For example, the user interface 214 may present various sequence patterns to the user for selection, as well as allowing the user to select the timing for presentation of the pattern sequence. The memory 104 may store a variety of predetermined pattern sequences that the user may be able to select. The user may also be able to enter a time, or times, into the user interface 214 at which the timing sequence is to be presented.

The device 200 may also include the visual indicator 216, the audio indicator 218, and/or the actuator 220 as one or more pattern indicators. Other types of pattern indicators may also be used. The user interface could also be presented on a separate device such as a PC or a smart device, which could communicate with device 200 to transfer the setting the user selected on the smart device.

Figure 3:
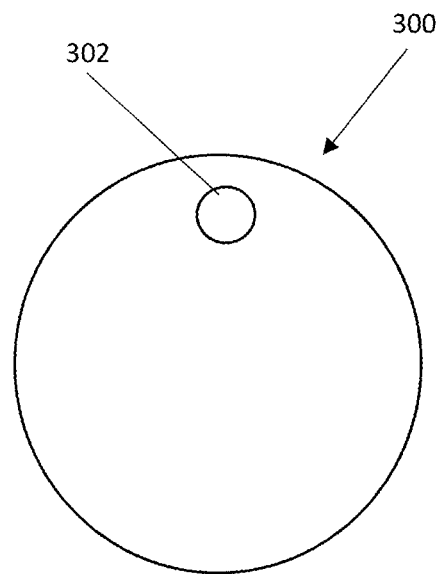
FIG. 3 illustrates an electronic device according to embodiments of the invention.

FIG. 3 illustrates a device 300 in accordance with embodiments of the invention. The device 300 may be in a round shape as illustrated, although other shapes may be used. The device 300 may be sized to wear on a person, such as in the form of a button. The device 300 may include a structure (not shown) to attach the device 300 to clothes of a user. For example, a pin or other type of attachment means may be utilized. The device 300 may also include a pattern indicator, which in this example is shown as an LED 302, although any of the pattern indicators described herein could be used.

Figure 4:
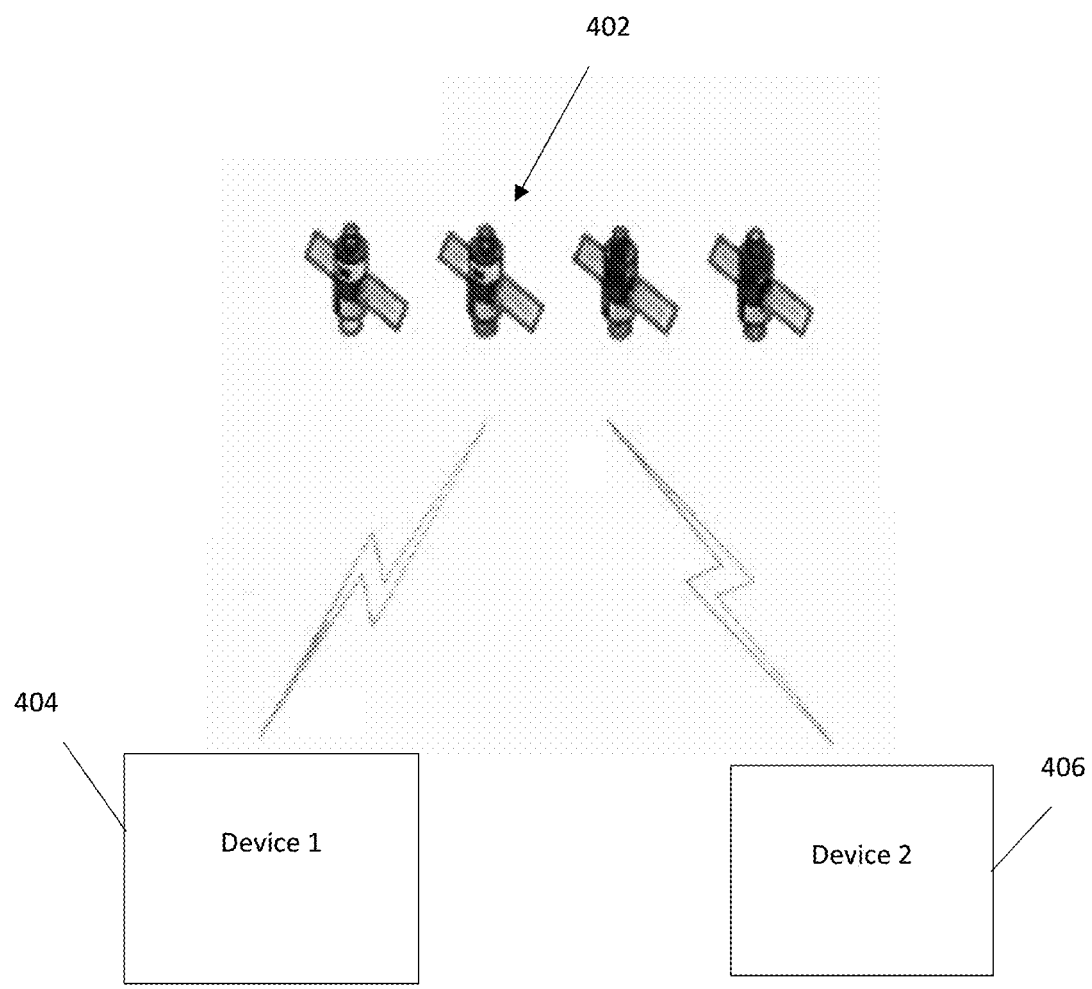
FIG. 4 illustrates electronic devices and satellites according to embodiments of the invention.

FIG. 4 illustrates a plurality of devices 404, 406 of the type illustrated in FIG. 1 or 2. The devices 404, 406 may receive signals from satellites 402, which may be configured to present a time reference signal to the devices. In some embodiments, the satellites 402 could also present the sequence pattern and/or the timing for presenting the sequence pattern to devices 404, 406. Alternatively, the sequence pattern and/or the timing for presenting the sequence pattern may be otherwise sent to or selected on the devices 404, 406.

Figure 5:
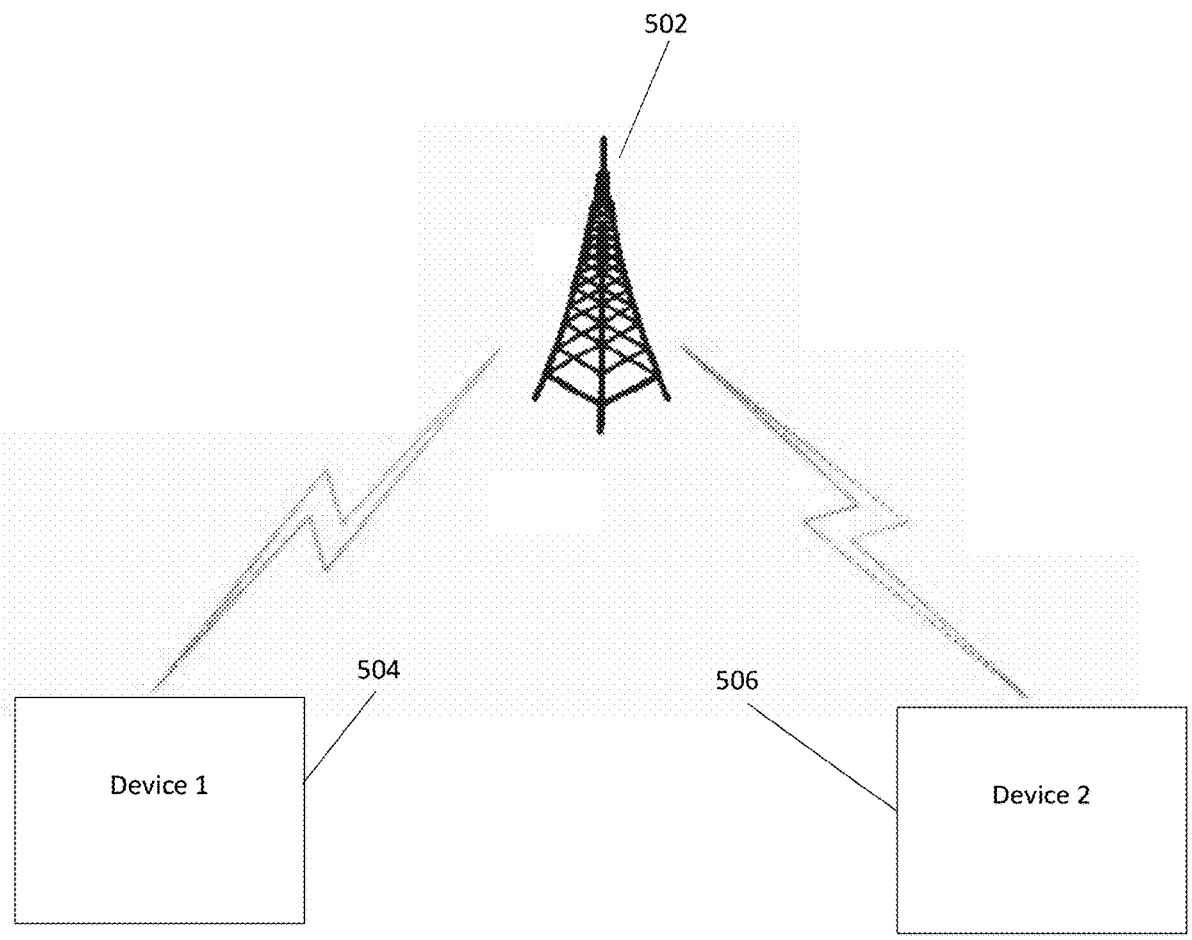
FIG. 5 illustrates electronic devices and a radio transmitter according to embodiments of the invention.

FIG. 5 illustrates a plurality of devices 504, 506 of the type illustrated in FIG. 1 or 2. The devices 504, 506 may be connected to radio transmitter 502, which may be configured to present a time reference signal to the devices. In some embodiments, the radio transmitter 502 could also present the sequence pattern and/or the timing for presenting the sequence pattern to devices 504, 506. Alternatively, the sequence pattern and/or the timing for presenting the sequence pattern may be otherwise sent to or selected on the devices 504, 506. Receiving an updated timing signal from an external source provides an updated clock signal to maintain accurate synchronization between devices.

The oscillator frequency may vary over time depending on the quality of the oscillator. The oscillator frequency tends to drift with time due to environmental factors. If the oscillator 202 is accurate, the clock in device 200 does not need to be reset as often, which can save battery life.

Figure 6:
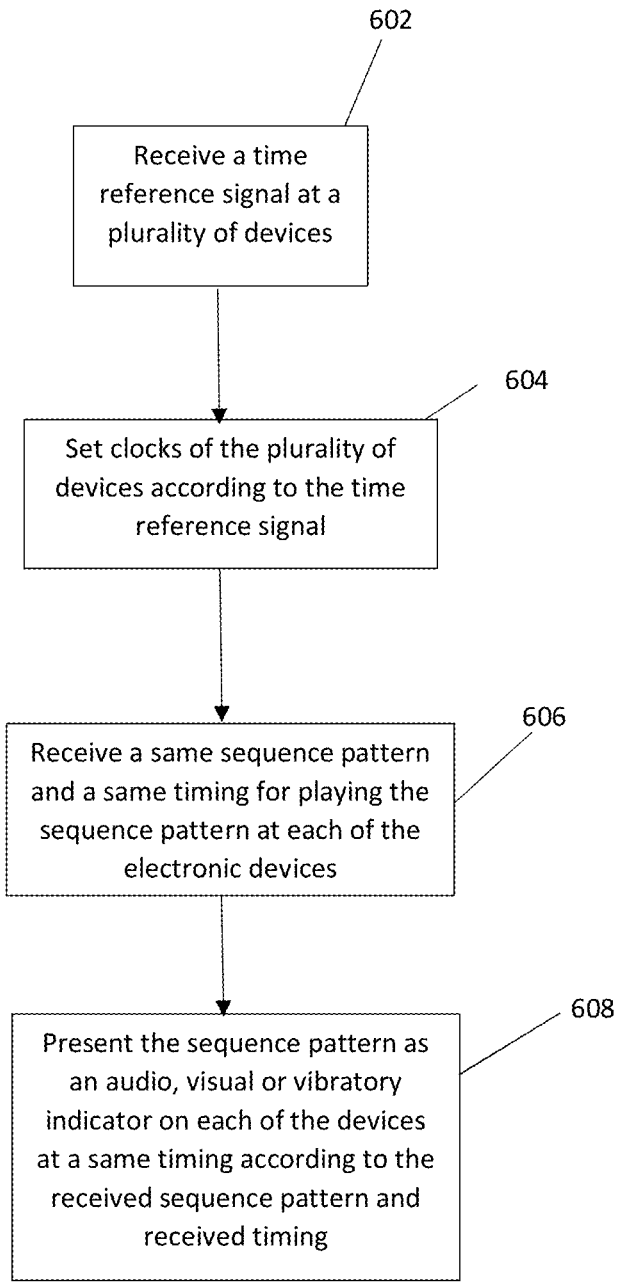
FIG. 6 illustrates a flowchart according to embodiments of the invention.

FIG. 6 illustrates a flowchart according to embodiments of the invention. At a step 602, the time reference signal is received at a plurality of the devices. As described herein, in step 604, the time reference signal is used to accurately set a clock of each of the devices.

At a step 606, a same sequence pattern and a same timing is received at each of the devices and stored therein. The sequence pattern and timing may be received in any of the manners described herein. Step 606 may be executed at any time even prior to step 602.

At a step 608, the sequence pattern is presented on the pattern indicator according to the received sequence pattern and timing. Any of the pattern indicators described herein may be used to present the sequence pattern.

Figure 7:
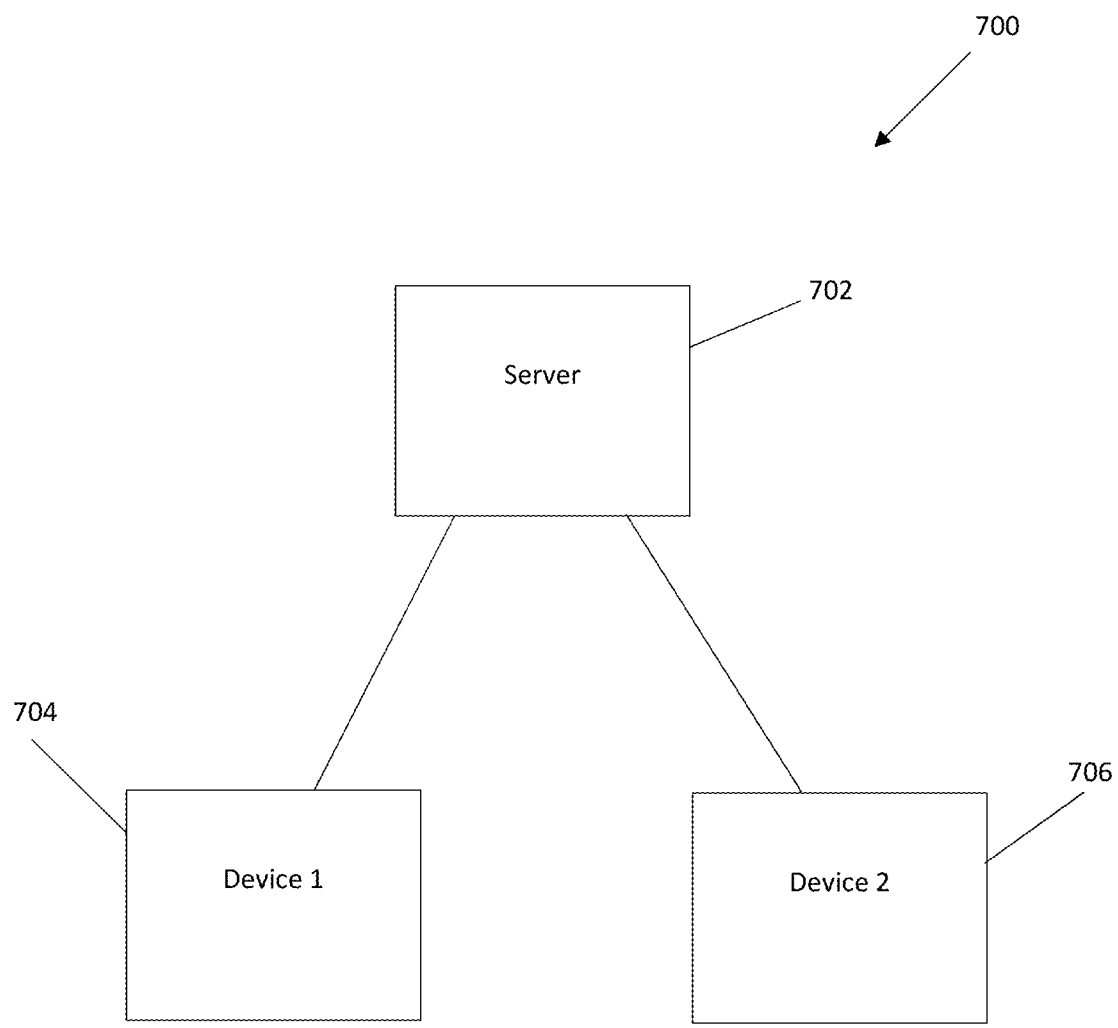
FIG. 7 illustrates a system according to embodiments of the invention.

FIG. 7 illustrates a system 700 according to embodiments of the invention. The system 700 includes a server 702 and two or more devices 704, 706. The devices 704, 706 may be in the configuration of any of the embodiments described herein. The server 702 may be utilized to send any of the time reference signal, the sequence pattern and/or the timing for presenting the sequence pattern to the devices 704, 706. Alternatively, any of the methods described herein of the time reference signal, the sequence pattern and/or the timing for presenting the sequence pattern may be utilized to send or select these items.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. An electronic device comprising:
    a processor;
    a timing receiver configured to receive a reference time signal to set a time of the electronic device;
    a sequence receiver configured to receive a sequence pattern and a timing for presenting the sequence pattern;
    a light-emitting diode configured to display the sequence pattern as a visual display; and
    a memory configured with non-transitory machine-readable code stored, the non-transitory machine-readable code configured to cause the processor to direct the light-emitting diode to present the sequence pattern as a visually recognizable pattern according to the received sequence pattern, and the received timing for presenting the sequence pattern in synchronization with the sequence pattern presented on at least one other electronic device, wherein the sequence receiver is configured to receive the sequence pattern and a timing for presenting the sequence pattern from a computing device.

2. The electronic device of claim 1, wherein the timing receiver is a GPS receiver.

3. The electronic device of claim 1, wherein the timing receiver is a radio receiver.

4. The electronic device of claim 1, wherein the sequence receiver is a light sensor.

5. The electronic device of claim 1, wherein the sequence receiver is a microphone.

6. The electronic device of claim 1, wherein the sequence receiver is a Bluetooth receiver and/or a WiFi receiver.

7. The electronic device of claim 1, wherein the sequence receiver comprises a user interface.

8. The electronic device of claim 7, wherein the user interface is configured to allow a user to select from a plurality of predetermined sequence patterns and/or a plurality of timings.

9. A method of presenting an audio, visual or vibratory sequence pattern at a plurality of electronic devices, comprising:
    receiving a same time reference signal at a timing receiver of each of the plurality of the electronic devices;
    setting a time for each of the electronic devices according to the received time reference signal;
    receiving a sequence pattern and a timing for presenting the sequence pattern at a sequence receiver of each of the electronic devices wherein the sequence receiver receives the sequence pattern and a timing for presenting the sequence pattern from a computing device; and
    presenting the sequence pattern as a synchronous audio, visual or vibratory indicator on each of the electronic devices according to the received sequence pattern and the received timing.

10. The method according to claim 9, wherein the timing receiver is a GPS receiver.

11. The method according to claim 9, wherein the timing receiver is a radio receiver.

12. The method according to claim 9, wherein the sequence receiver is a light sensor.

13. The method according to claim 9, wherein the sequence receiver is a microphone.

14. The method according to claim 9, wherein the sequence receiver is a Bluetooth receiver and/or a WiFi receiver.

15. The method according to claim 9, wherein the sequence receiver comprises a user interface and the method further comprises presenting
   a plurality of selectable sequence patterns on the user interface for user selection.

16. An electronic device comprising:
   a processor;
   a timing receiver configured to receive a time reference signal to set a time of the electronic device;
   a sequence receiver configured to receive a sequence pattern and a timing for presenting the sequence pattern;
   a pattern indicator configured to present the sequence pattern;
   a user interface configured to allow a user to select from a plurality of predetermined sequence patterns and/or a plurality of timings; and
   a memory configured with non-transitory machine-readable code stored, the machine-readable code configured to cause the processor to direct the pattern indicator to present the sequence pattern as a visual, audio or vibratory sequence that is perceivable by humans according to the received timing in synchronization with the sequence pattern presented on at least one other electronic device.

17. The electronic device of claim 16, wherein the timing receiver is one of a GPS receiver or a radio receiver.

18. The electronic device of claim 16, wherein the sequence receiver is one of a light sensor, a microphone, a Bluetooth receiver, a WiFi receiver or a user interface.

* * * * *